(12) United States Patent
Inaba et al.

(10) Patent No.: US 6,179,607 B1
(45) Date of Patent: Jan. 30, 2001

(54) TWO-PLATEN MOLD-CLAMPING APPARATUS

(75) Inventors: Yoshiharu Inaba, Kawasaki; Hideo Naito, Hino; Kikuo Watanabe, Oshino-mura, all of (JP)

(73) Assignee: Fanuc LTD, Yamanashi (JP)

( * ) Notice: Under 35 U.S.C. 154(b), the term of this patent shall be extended for 0 days.

(21) Appl. No.: 08/225,087

(22) Filed: Apr. 8, 1994

Related U.S. Application Data

(62) Continuation of application No. 07/817,956, filed on Jan. 8, 1992, now abandoned, which is a continuation of application No. 07/457,779, filed as application No. PCT/JP89/00679 on Jul. 5, 1989, now abandoned.

(30) Foreign Application Priority Data

Jul. 8, 1988 (JP) .................................................. 63-169118

(51) Int. Cl.[7] .................................................. B29C 33/22
(52) U.S. Cl. ...................... 425/595; 425/589; 425/451.7; 425/451.9
(58) Field of Search ..................................... 425/150, 214, 425/450.1, 451.7, 451.9, 589, 590, 594, 595, DIG. 221; 72/454; 164/343

(56) References Cited

U.S. PATENT DOCUMENTS

| | | | |
|---|---|---|---|
| 1,288,648 | * 12/1918 | Morgan | .................................. 72/454 |
| 2,370,622 | * 3/1945 | Gastrow | ...................... 425/DIG. 221 |

(List continued on next page.)

FOREIGN PATENT DOCUMENTS

| | | | |
|---|---|---|---|
| 0 213 211 | 2/1986 | (EP) . | |
| 1196394 | * 11/1959 | (FR) | .................................. 425/451.2 |
| 55-28383 | * 7/1980 | (JP) . | |
| 60-191416 | * 12/1985 | (JP) . | |
| 88/09256 | * 12/1988 | (WO) . | |

OTHER PUBLICATIONS

Patent Abstracts of Japan, vol. 11, No. 263 (M–619) [2710], Aug. 26, 1987 & JP–A–62 066 916 (Toshiba Mach. Co., Ltd) Mar. 26, 1987.
Patent Abstracts of Japan, vol. 14, No. 113 (M–944) [4056], Mar. 2, 1990 & JP–A–1 314 128 (Yazaki Kako K.K.) Dec. 19, 1989.

*Primary Examiner*—Harold Pyon
*Assistant Examiner*—Joseph Leyson
(74) *Attorney, Agent, or Firm*—Staas & Halsey LLP

(57) ABSTRACT

A two-platen mold-clamping apparatus is provided, which requires neither tie bars nor rear platen, and is thus comprised of a reduced number of components, is easy to maintain, and is low-priced. A plurality of ball nuts are mounted on a movable platen so as to be rotatable but axially immovable relative to the movable platen. The movable platen mounted for reciprocal motion relative to a stationary platen. A respective ball screw is threadedly engaged with each of the ball nuts and each balls screw has an end portion that is fixed to the stationary platen. A motor rotates the ball nuts by means of sprockets and a chain so that the ball nuts and the movable platen are moved toward the stationary platen. The ball screws are moved longitudinally relative to the movable platen so as to generate a mold-clamping force after a mold-touch state has been reached.

3 Claims, 2 Drawing Sheets

U.S. PATENT DOCUMENTS

| | | | |
|---|---|---|---|
| 2,484,344 | * | 10/1949 | Hiller et al. .......................... 425/214 |
| 3,104,433 | | 9/1963 | Hoern .................................. 164/312 |
| 3,208,105 | * | 9/1965 | White ................................ 425/451.7 |
| 3,346,925 | * | 10/1967 | Maier ......................... 425/DIG. 221 |
| 3,540,081 | * | 11/1970 | Carrieri et al. ....................... 425/150 |
| 3,590,437 | * | 7/1971 | Annis et al. ................ 425/DIG. 221 |
| 3,599,289 | * | 8/1971 | Girola ........................ 425/DIG. 221 |
| 3,669,599 | * | 6/1972 | Snider et al. ...................... 425/451.9 |
| 3,719,445 | * | 3/1973 | Sindelar .............................. 425/150 |
| 3,756,757 | * | 9/1973 | Grundmann ........................ 425/595 |
| 3,890,081 | * | 6/1975 | Grundmann ........................ 164/343 |
| 4,172,872 | | 10/1979 | Nagai .................................. 264/519 |
| 4,533,304 | * | 8/1985 | Amano et al. ..................... 425/450.1 |
| 4,540,359 | * | 9/1985 | Yamazaki ............................. 425/589 |
| 4,608,848 | * | 9/1986 | Mele ...................................... 72/184 |
| 4,696,632 | * | 9/1987 | Inaba .................................... 425/590 |
| 4,770,020 | * | 9/1988 | Mele ...................................... 72/184 |
| 4,781,568 | * | 11/1988 | Inaba .................................... 425/451 |
| 4,797,086 | * | 1/1989 | Adachi .................................. 425/590 |
| 4,874,309 | * | 10/1989 | Kushibe et al. ..................... 425/589 |
| 4,906,173 | * | 3/1990 | Inaba et al. ........................ 425/450.1 |
| 4,929,165 | * | 5/1990 | Inaba et al. .......................... 425/590 |
| 4,968,239 | * | 11/1990 | Inaba et al. .......................... 425/590 |
| 4,976,602 | * | 12/1990 | Yamazaki .................... 425/DIG. 221 |
| 5,110,283 | * | 5/1992 | Bluml et al. ....................... 425/450.1 |

* cited by examiner

TWO-PLATEN MOLD-CLAMPING APPARATUS

This application is a continuation of U.S. application Ser. No. 07/817,956 filed on Jan. 8, 1992, now abandoned, which is a continuation of U.S. application Ser. No. 07/457,779 filed on Jan. 11, 1990, now abandoned, which is the National Stage of International Application No. PCT/JP89/00679 filed on Jul. 5, 1989.

TECHNICAL FIELD

The present invention relates to a two-platen mold-clamping apparatus for use in molding machines such as injection molding machines and press machines.

BACKGROUND ART

In general, three-platen type mold-clamping apparatuses having stationary, movable and rear platens, have been employed in molding machines such as injection molding machines. The mold-clamping apparatus of this kind are designed to use a toggle mechanism, a crank mechanism or a ball-screw/ball-nut mechanism to reciprocate the movable platen along a plurality of parallel tie bars which extend between and interconnect the stationary platen and the rear platen for mold-opening, mold-closing and mold-clamping operations. Such mold-clamping apparatus is arranged so that the tie bars may be elongated, during the mold-clamping operation, for generating a mold clamping force. And respective ends of the tie bars are supported by the rear platen to establish and maintain a constant parallel relationship between the stationary and movable platens. These conventional three-platen type mold-clamping apparatuses inevitably include a plurality of tie bars and the rear plate. However, these components are expensive, and it is therefore difficult to produce a three platen mold-clamping apparatus which is low-priced and free from complicated maintenance.

DISCLOSURE OF THE INVENTION

The object of the present invention is to provide a two-platen mold-clamping apparatus which has a reduced number of structural parts, and does not include tie bars or a rear platen, and is therefore easy to maintain and low-priced.

In order to achieve the above-mentioned object, the two-platen mold-clamping apparatus of the present invention includes a stationary platen; a movable platen disposed for reciprocal motion relative to the stationary platen along a predetermined path; a plurality of ball nuts each mounted for movement with the movable platen along the path of rotation relative thereto; a respective elongated ball screw threadedly engaged with each of the ball nuts each ball screw having an end portion fixed to the stationary plate; a motor having an output shaft and mounted on the movable platen; and means for operatively coupling the output shaft of the motor to the ball nuts, whereby ball screws may be moved longitudinally relative to the moveable platen, during a mold-clamping operation, so as to generate a mold-clamping force.

As a result of the present invention which provides a plurality of ball screws, each of which is fixed to a stationary platen, and each of which is threadedly engaged with a respective ball nut that is coupled to a motor and that is axially immovably mounted on a movable platen, the ball screws may be moved longitudinally relative to the movable platen for generating a mold-clamping force. Accordingly, neither a rear platen nor tie bars are required and the resultant mold-clamping apparatus includes a reduced number of structural parts, is easy to maintain, and is low-priced.

BEST MODE OF CARRYING OUT THE INVENTION

Figure 1:
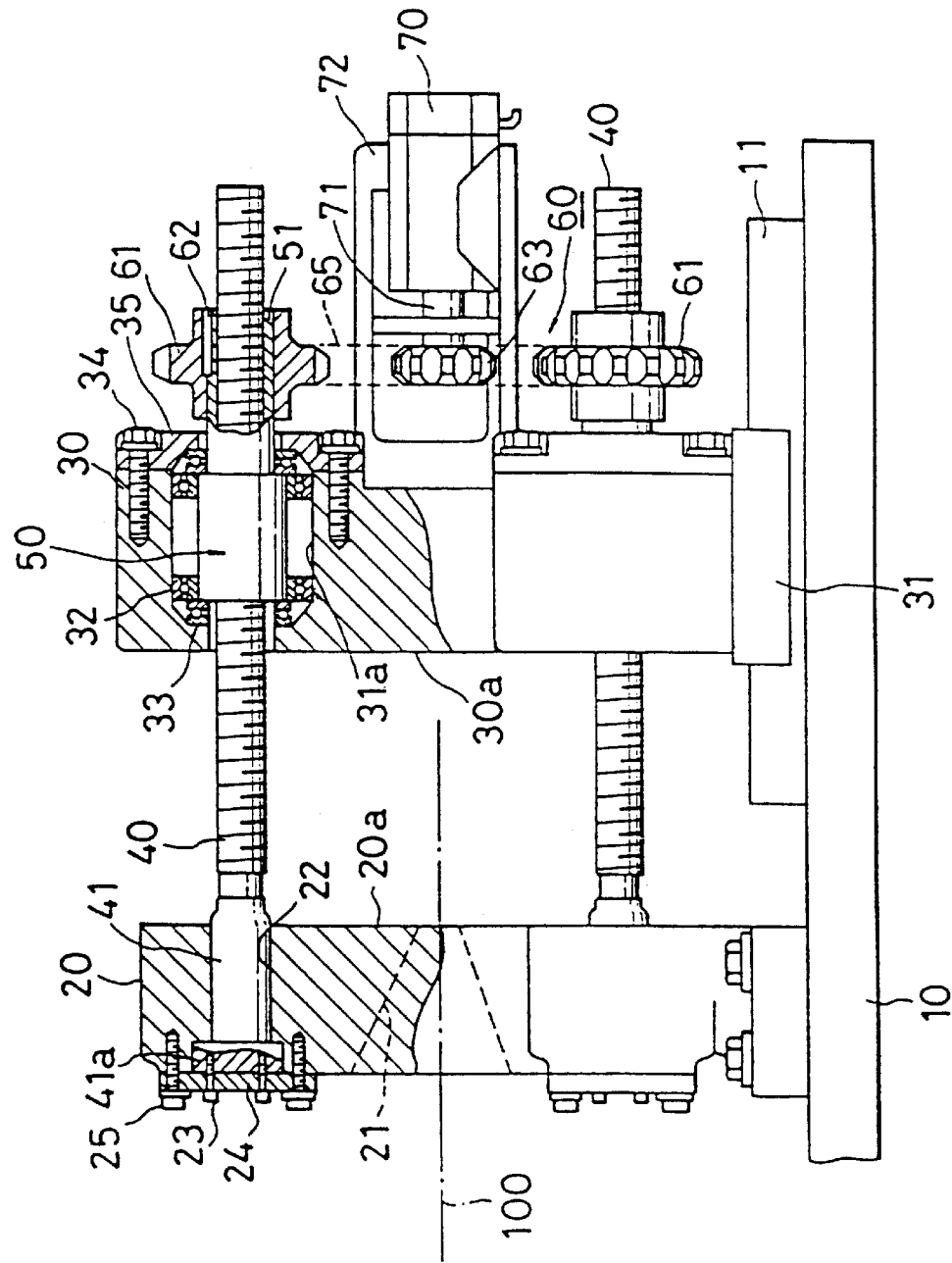
FIG. 1 is a front elevational view, partly in cross section, showing a two-platen mold-clamping apparatus according to an embodiment of the present invention.

FIG. 1 illustrates a two-platen mold-clamping apparatus, which may be mounted on an injection molding machine, for example. The apparatus of FIG. 1 may be of small-capacity producing a mold-clamping force on the order of 30 tons. The mold-clamping apparatus comprises a stationary platen 20 fixed on a frame 10 of an injection molding machine, and a movable platen 30. Platens 20 and 30 are disposed so that a parallel relationship is established between their opposed end surfaces 20a and 30a which are adapted for carrying respective mold halves (not shown). Movable platen 30 is provided with a leg portion 31 facilitating smooth reciprocal motion thereof relative to stationary platen 20 along a rail 11 provided on an upper face of frame 10. Leg portion 31 may be provided with support rollers and/or a guide member slidably engaged with the rail 11 in a manner to prevent portion 31 from being disengaged from rail 11. Such rollers and guide members are conventional and have not been illustrated here.

Figure 2:
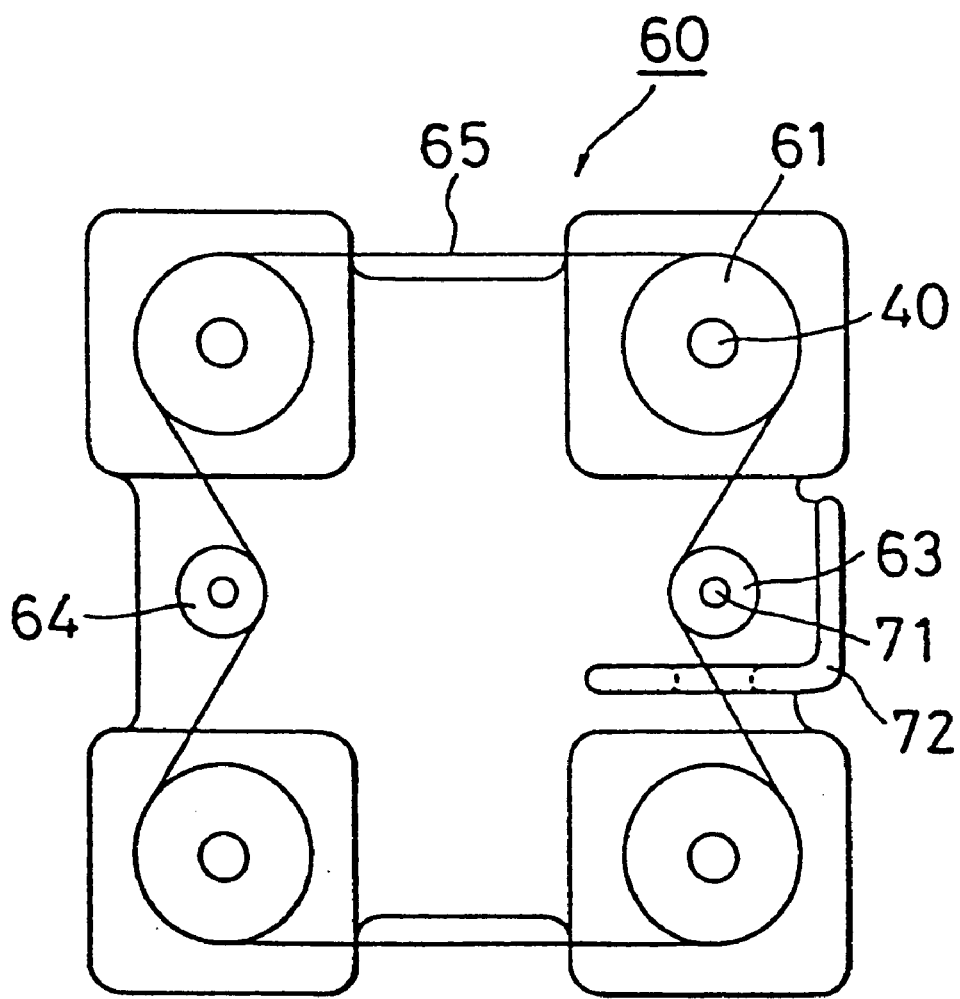
FIG. 2 is a schematic side view showing a power transmission mechanism which connects four ball screws with the motor output shaft shown in FIG. 1.

As shown in FIGS. 1 and 2, the mold-clamping apparatus is further provided with four elongated ball screws 40 each of which extends in parallelism relative to an axis 100, that is parallel to the upper face of the frame 10 and passes through a nozzle hole 21 which is formed in the stationary platen 20 in alignment with the centers of the surfaces 20a and 30a of platens 20 and 30. Preferably, the four ball screws 40 are disposed at equal angular intervals around the axis 100 in the circumferential direction, and the same are spaced radially from the axis 100 the same distance. Each of the ball screws 40 has an end portion, consisting of a step shaft 41 that is fitted in a respective corresponding stepped hole 22 formed in stationary platen 20. Each ball screw 40 is fixed to stationary plate 20 through a respective cap plate 24, which is fixed to an outer end face of a large-diameter portion 41a of the respective step shaft 41 by screws 23, and is also fixed to the outer end face of the stationary platen 20 by bolts 25. The inner end face of each large-diameter portion 41a is disposed in contact with a respective annular end face which is formed in each stepped hole as shown. That is, the ball screws 40 are mounted so as to be axially immovable and unrotatable relative to stationary platen 20.

A respective ball nut (one of which is shown by the reference number 50), is threadedly engaged with each of the ball screws 40. The ball nuts 50 are received in respective stepped holes (one of which is indicated by reference numeral 312) formed in the portions of the movable platen 30 through which the ball screws 40 extend. Each of the ball nuts 50 is supported for rotation relative to the movable platen 30 and for axial movement therewith. That is to say, ball nuts 50 are mounted so as to be axially immovable relative to movable platen 30, by means of respective radial bearings 32 and respective thrust bearings 33 which are respectively disposed in contact with the inner end faces of the portions of the movable platen 30 through which the ball screws extend as shown and with an inner end face of a respective cap member 35 fixed to an outer end face of the movable platen 30 by bolts 34.

Integrally formed with each ball nut 50 is a sleeve 51 which is fitted around the corresponding ball screw 40 and projects outwardly of the movable platen 30 in the direction away from the stationary platen 20. A sprocket 61, which forms part of power transmission mechanism 60, is mounted on the projecting portion of each sleeve 51 for rotation in unison therewith by means of a mounting member 62 comprised of a key member or a coupling member (which is not shown) for variable adjustment of the phase relationship between the rotational position of each ball nut 50 and that of an output shaft 71 of a mold-clamping motor 70. Each coupling member comprises two annular members which are wedge shaped in cross section and which are disposed between opposing circumferential faces of the sleeves 51 and the corresponding sprockets 61, and a clamping member for causing the annular members to be urged into contact with each other. The coupling member is arranged to couple the sleeves 51 and the corresponding sprockets 61 for rotation together through the annular members when the annular members are urged into contact with each other and with a corresponding one of the sleeves 51 and the sprockets 61. The coupling members are arranged so that when the annular members are out of contact with each other the rotational phase-relationship between the ball nuts 50 and the motor output shaft 71 may be adjusted.

The mold-clamping motor 70 is fixed to an outer end face of the movable platen 30 through a support member 72, and the same is disposed in such a position that the output shaft 71 thereof is located close to the movable platen 30 so as to reduce flexure of the ball screws 40 and the like. Further, the motor 70 is connected to a control unit (not shown) of the injection molding machine. Affixed to the motor output shaft 71 is a sprocket 63 which is disposed in planar alignment with the four sprockets 61. Further, a sprocket 64 is disposed in planar alignment with the sprocket 63 and with the sprockets 61 as shown, and a chain 65 is stretched between these sprockets 61, 63 and 64, as shown in FIG. 2. As a consequence, the output shaft 71 of the mold-clamping motor 70 is operatively connected to each of the ball nuts 50 through the power transmission mechanism 60 comprised of the aforesaid elements 61, 62, 64 and 65. Meanwhile, the sprocket 64 is coupled to a brake unit (not shown) which is actuated under the control of the control unit upon completion of a mold-clamping operation to reduce the load applied to the motor 70 during the mold-clamping operation. Furthermore, the mold-clamping apparatus is provided with a pressure detector (not shown) for detecting when a predetermined mold-clamping force is reached. For instance, the detector is comprised of a strain detector having a strain gauge mounted on the ball screw 40 and operable to detect a minute movement of the ball screw 40 relative to platen 30 which occurs during the mold-clamping operation.

The operation of the two-platen mold-clamping apparatus is explained hereinbelow.

During a mold-closing operation, the mold-clamping motor 70 drivingly rotates shaft 71 and sprocket 63 in the forward direction under the control of the control unit. With the forward rotation of the motor 70, the four ball nuts 50, respectively coupled to the motor 70 through the sprocket 63, the chain 65 and the sprockets 61, are rotated in the forward direction in synchronism with each other. As a result, the ball nuts 50 and the movable platen 30 which is axially immovably mounted relative to the ball nuts are moved toward the stationary platen 20 for the mold-closing operation. Since the movable platen 30 has leg portion 31 which is slidably engaged with the rail 11 provided on the frame 10 of the injection molding machine, and further since the four ball screws 40 having their opposite end portions respectively supported by the platens 20 and 30 are disposed in parallel relationship relative to each other, with a predetermined accuracy, the movable platen 30 smoothly moves toward the stationary platen 20. While the parallel relationship between these platens remains unchanged. Thus a mold-touch state is reached, wherein mold halves mounted on the platens 20 and 30 are in contact with each other.

After the mold-touch state is reached, the motor 70 is further rotated forwardly for the mold-clamping operation. At this time, the mold halves are urged into contact with each other so that the ball nuts 50 are no longer movable toward stationary plate 20. A slight further longitudinal movement is generated in the ball screws 40 as the ball nuts 50 are rotated with the motor rotation, but with no axial movement. The brake device is operated in response to the output of a pressure detector which is delivered when a predetermined mold-clamping force has been generated. The mold-clamping force is applied uniformly to the stationary and movable platens 20 and 30 and therefore to the mold as a result of the fact that the four ball screws 40 are disposed at equal angular intervals around the axis 100 which passes through the centers of the mold mounting faces of the platens, and the same are spaced radially from the axis 100 the same distance.

Upon completion of an injection molding operation by means of an injection mechanism (not shown), the motor 70 is rotated in the reverse direction, to cause the ball nuts 50 to rotate in the reverse direction so that the ball nuts 50 and the movable platen 30 are moved away from the stationary platen 20 for mold-opening operation.

The present invention is not limited to the foregoing. For instance the mold-clamping motor 70 may be in the form of a servomotor wherein the output torque is controlled in an open-loop manner by a numerical control unit of the injection molding machine, to a value corresponding to the predetermined mold-clamping force. Alternatively, the output torque of the servomotor may be controlled in a feedback manner in accordance with a pressure detector output. Further, a brake mechanism may be employed in combination of the servomotor. In mounting the ball nuts on the movable platen so as to be rotatable but axially immovable relative thereto, means other than thrust bearing and radial bearings may be used. Further, although the power transmission mechanism comprised of the chain and the sprockets is provided in the illustrated embodiment, a combination of a timing belt and pulleys or a gear train may be used. Moreover, a plurality of motors may be used for driving the respective ball nuts.

What is claimed is:

1. A two-platen mold-clamping apparatus, comprising:
   a stationary platen;
   a movable platen disposed for reciprocal motion relative to said stationary platen along a predetermined path to effect mold opening and closing;
   a plurality of ball nuts;
   a respective bearing mechanism rotatably mounted each said ball nut on said movable platen for rotation relative thereto about an axis extending longitudinally of the path,
   said bearing mechanisms each being operable to prevent movement of the corresponding respective ball nut relative to the movable platen in a radial direction and in an axial direction relative to said axis;

a respective elongated ball screw continuously threadably engaged with each of said ball nuts, each ball screw having an end portion fixed to said stationary platen, the opposite ends of said screws extending through the movable platen and being supported by said ball nuts and including threaded portions of sufficient length to accommodate both mold-closing and mold-clamping operations;

a motor mounted on said movable platen for movement therewith and having an output shaft; and operating structure operatively coupling said output shaft of said motor to said ball nuts for rotating the ball nuts to move said ball nuts and therefore the movable platen longitudinally of the ball screws during both mold-closing and mold-clamping operations to thereby generate a mold-clamping force.

2. A two-platen mold-clamping apparatus according to claim 1, wherein each of said ball nuts has an extension portion formed integrally therewith which projects in a direction away from said stationary platen, and said operating structure operatively couples said extension portion with said output shaft of said motor.

3. A two-platen mold-clamping apparatus, comprising:

a stationary platen;

a movable platen disposed for reciprocal motion relative to said stationary platen along a predetermined path to effect mold opening and closing;

a plurality of ball nuts;

a respective bearing mechanism rotatably mounting each said ball nut on said movable platen for rotation relative thereto about an axis extending longitudinally of the path, said bearing mechanisms each being operable to prevent movement of the corresponding respective ball nut relative to the movable platen in a radial direction and in an axial direction relative to said axis;

a respective elongated ball screw continuously threadably engaged with each of said ball nuts, each ball screw having an end portion fixed to said stationary platen, the opposite ends of said screws being supported by said ball nuts and including threaded portions of sufficient length to accommodate both mold-closing and mold-clamping operations;

a motor mounted on said movable platen for movement therewith and having an output shaft; and operating structure operatively coupling said output shaft of said motor to said ball nuts for rotating the ball nuts to move said ball nuts and therefore the movable platen longitudinally of the ball screws during both mold-closing and mold-clamping operations to thereby generate a mold-clamping force, said platens each having a mold-mounting face disposed centrally thereof, and said ball screws being disposed at equal angular intervals around an axis passing through the centers of the mold-mounting-faces, and being spaced radially from said axis the same distance.

\* \* \* \* \*